United States Patent
Polonowski (10) Patent No.: US 11,480,143 B2
(45) Date of Patent: Oct. 25, 2022

(54) METHODS AND SYSTEMS FOR A DUCTED INJECTOR

(71) Applicant: Ford Global Technologies, LLC, Dearborn, MI (US)

(72) Inventor: Christopher Polonowski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/989,397

(22) Filed: Aug. 10, 2020

(65) Prior Publication Data

US 2022/0042484 A1    Feb. 10, 2022

(51) Int. Cl.
| | | |
|---|---|---|
| *F02M 55/00* | (2006.01) | |
| *F02M 61/14* | (2006.01) | |
| *F02M 61/04* | (2006.01) | |

(52) U.S. Cl.
CPC ........ *F02M 55/008* (2013.01); *F02M 61/042* (2013.01); *F02M 61/14* (2013.01); *F02M 2700/126* (2013.01)

(58) Field of Classification Search
CPC .... F02M 55/008; F02M 61/14; F02M 61/042; F02M 2700/126; F02M 67/06; F02B 53/04; F02B 53/10
USPC ................ 123/217, 200, 203, 205
See application file for complete search history.

(56) References Cited

U.S. PATENT DOCUMENTS

| | | | | | |
|---|---|---|---|---|---|
| 3,168,078 | A | * | 2/1965 | Lamm ..................... | F02B 53/00 123/208 |
| 3,608,531 | A | * | 9/1971 | Baxendale ............. | F02M 69/08 123/472 |
| 3,867,910 | A | * | 2/1975 | Galonska ................ | F02B 53/08 123/211 |
| 3,872,839 | A | * | 3/1975 | Russell .................... | F02B 53/02 60/299 |
| 3,980,056 | A | * | 9/1976 | Kraus ..................... | F02M 53/06 123/472 |
| 3,980,064 | A | * | 9/1976 | Ariga ...................... | F02B 51/02 123/203 |
| 4,006,719 | A | * | 2/1977 | Kanda ................. | F02M 69/047 239/405 |
| 4,060,058 | A | * | 11/1977 | Hideg ..................... | F02B 53/06 123/219 |
| 4,084,549 | A | * | 4/1978 | Satow ..................... | F02B 55/16 60/901 |
| 4,142,505 | A | * | 3/1979 | Inoue .................... | F02P 15/005 123/211 |
| 4,413,781 | A | * | 11/1983 | Iwata ................... | F02M 57/021 239/91 |

(Continued)

FOREIGN PATENT DOCUMENTS

| | | | | | |
|---|---|---|---|---|---|
| JP | 54057004 | A | * | 5/1979 | ............. F02B 47/08 |
| JP | 0533742 | A | * | 2/1993 | |

(Continued)

*Primary Examiner* — Sizo B Vilakazi
*Assistant Examiner* — Brian R Kirby
(74) *Attorney, Agent, or Firm* — Vincent Mastrogiacomo; McCoy Russell LLP (57) ABSTRACT

Methods and systems are provided for a ducted fuel injector. In one example, the ducted fuel injector comprises a plurality of passages, with at least one of the passages configured to receive an oxygen poor gas from a reservoir or an adjacent cylinder to decrease a likelihood of pre-ignition in the duct.

20 Claims, 4 Drawing Sheets

(56) References Cited

U.S. PATENT DOCUMENTS

| | | | | |
|---|---|---|---|---|
| 4,637,366 A | * | 1/1987 | Cowles | F02M 26/17 123/698 |
| 4,787,359 A | * | 11/1988 | Blake | F02M 31/18 123/557 |
| 4,982,716 A | * | 1/1991 | Takeda | F02M 69/08 239/432 |
| 5,237,966 A | * | 8/1993 | Katoh | F02M 69/54 123/470 |
| 5,305,721 A | * | 4/1994 | Burtis | F01C 19/04 123/211 |
| 5,746,189 A | * | 5/1998 | Kuzuya | F02D 21/08 123/568.2 |
| 6,095,437 A | * | 8/2000 | Nozawa | F02D 7/02 239/408 |
| 6,571,781 B2 | * | 6/2003 | Cho | F02M 26/36 123/585 |
| 6,920,861 B2 | * | 7/2005 | Hayakawa | F02M 53/06 123/585 |
| 9,145,837 B2 | | 9/2015 | Klingbeil | |
| 10,060,334 B2 | | 8/2018 | Polonowski et al. | |
| 10,077,724 B1 | | 9/2018 | Kurtz et al. | |
| 10,544,726 B2 | | 1/2020 | Kurtz | |
| 10,641,160 B2 | | 5/2020 | Polonowski et al. | |
| 2004/0112344 A1 | * | 6/2004 | Wark | F02M 26/34 123/585 |
| 2005/0011965 A1 | * | 1/2005 | Casey | F02M 69/047 239/533.2 |
| 2007/0169464 A1 | * | 7/2007 | Saito | F02D 41/1494 123/685 |
| 2012/0186555 A1 | | 7/2012 | Mueller | |
| 2013/0218438 A1 | * | 8/2013 | Surnilla | F02D 41/0025 701/102 |
| 2016/0097360 A1 | | 4/2016 | Mueller | |
| 2017/0241368 A1 | | 8/2017 | Anders et al. | |
| 2018/0363575 A1 | * | 12/2018 | Koponen | F02B 11/02 |
| 2020/0025063 A1 | * | 1/2020 | Tanaka | F02B 53/12 |

FOREIGN PATENT DOCUMENTS

| | | | |
|---|---|---|---|
| JP | 05033742 A | * | 2/1993 |
| JP | 05209561 A | * | 8/1993 |
| JP | 2003286876 A | | 10/2003 |
| JP | 2015068256 A | * | 4/2015 |
| JP | 2015068256 A | * | 4/2015 |
| JP | 2015222017 A | * | 12/2015 |
| JP | 2015222017 A | * | 12/2015 |

* cited by examiner

METHODS AND SYSTEMS FOR A DUCTED INJECTOR

FIELD

The present description relates generally to a ducted fuel injector.

BACKGROUND/SUMMARY

In diesel engines, air is drawn into a combustion chamber during an intake stroke by opening one or more intake valves. Then, during the subsequent compression stroke, the intake valves are closed, and a reciprocating piston of the combustion chamber compresses the gases admitted during the intake stroke, increasing the temperature of the gases in the combustion chamber. Fuel is then injected into the hot, compressed gas mixture in the combustion chamber, resulting in combustion of the fuel. Thus, in a diesel engine, the fuel may combust with the air in the combustion chamber due to the high temperature of the air, and may not be ignited via a spark plug as in a gasoline engine. The combusting air-fuel mixture pushes on the piston, driving motion of the piston, which is then converted into rotational energy of a crankshaft.

However, the inventors have recognized potential issues with such diesel engines. As one example, diesel fuel may not mix evenly with the air in the combustion chamber, leading to the formation of dense fuel pockets in the combustion chamber. These dense regions of fuel may produce soot as the fuel combusts. As such, conventional diesel engines include particulate filters for decreasing an amount of soot and other particulate matter in their emissions. However, such particulate filters lead to increased cost and increased fuel consumption.

Modern technologies for combating engine soot output include features for entraining air with the fuel prior to injection. This may include passages located in the injector body, as an insert into the engine head deck surface, or in engine head. Ambient air mixes with the fuel, cooling the injection temperature, prior to delivering the mixture to the compressed air in the cylinder. By entraining cooled air with the fuel prior to injection, a lift-off length is lengthened and start of combustion is retarded. This limits soot production through a range of engine operating conditions, reducing the need for a particulate filter.

However, the inventors herein have recognized potential issues with such injectors. As one example, the previously described fuel injectors may no longer sufficiently prevent soot production to a desired level in light of increasingly stringent emissions standards. As such, particulate filters may be located in an exhaust passage, thereby increasing a manufacturing cost and packaging restraint of the vehicle.

In one example, the issues described above may be addressed by a system comprising a rotary engine comprising a ducted fuel injector. The ducted fuel injector comprises a plurality of passages, wherein at least one of the passages is configured to receive oxygen poor gases from a reservoir or an adjacent cylinder. In this way, pre-ignition in the duct may not occur.

In some examples, the reservoir may be replenished via oxygen poor gases from one or more cylinders. The oxygen poor gases flow through the plurality of passages and mix with combustion chamber gases prior to a fuel injection. Once the fuel injection occurs, the gases mix with the fuel injection and mitigate a likelihood of pre-ignition in the duct. By doing this, a lift-off length is increased and soot production is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
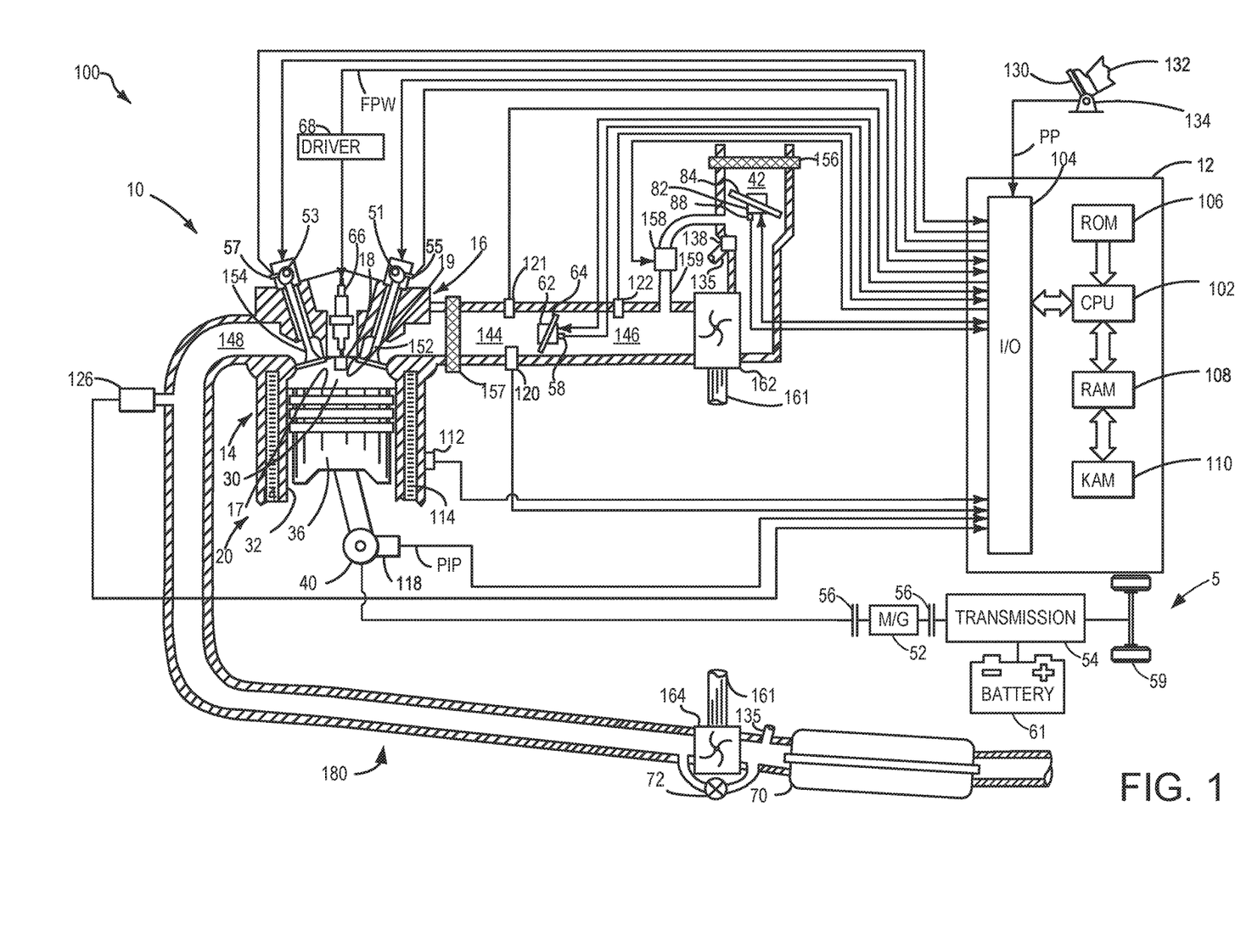
FIG. 1 illustrates a schematic of an engine included in a hybrid vehicle.
Figure 6:
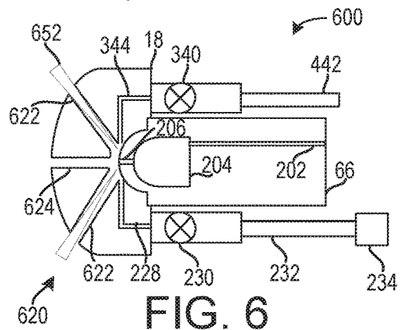
FIG. 6 illustrates a multi orifice nozzle injector configured to receive gases from an adjacent cylinder and dilute gases from a reservoir.
Figure 7:
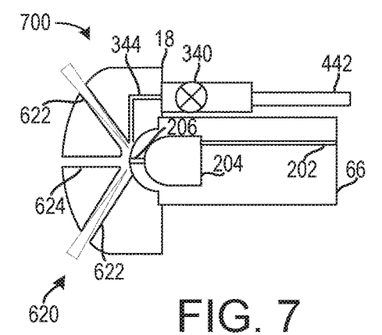
FIG. 7 illustrates a multi-orifice nozzle injector configured to receive only gases from an adjacent cylinder.
Figure 8:
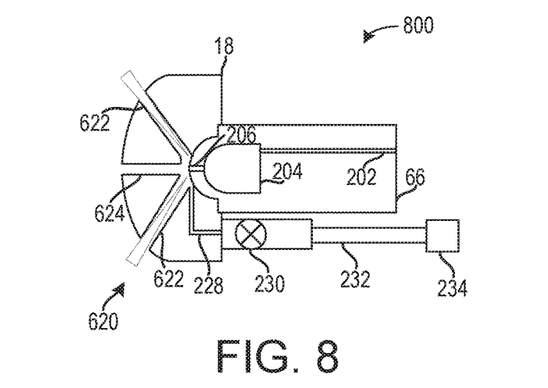
FIG. 8 illustrates a multi-orifice nozzle injector configured to receive only dilute gases from a reservoir.
Figure 9A:
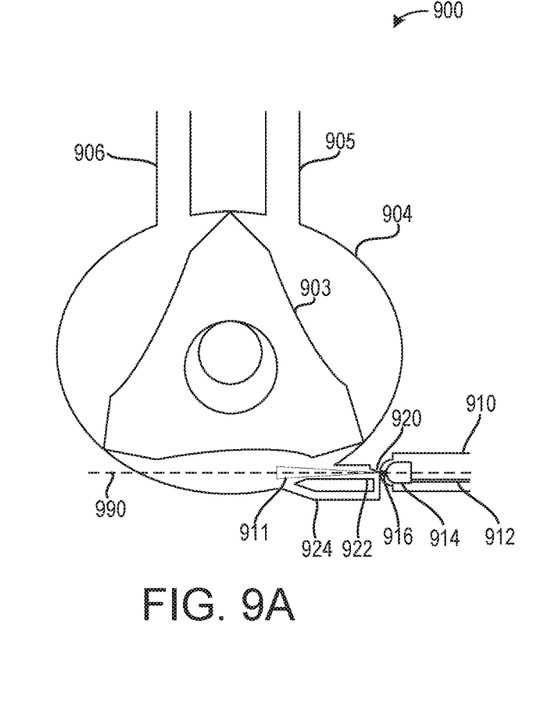
FIGS. 9A, 9B, and 9C illustrate different positions of a wankel engine comprising the injector of FIG. 4.
Figure 9B:
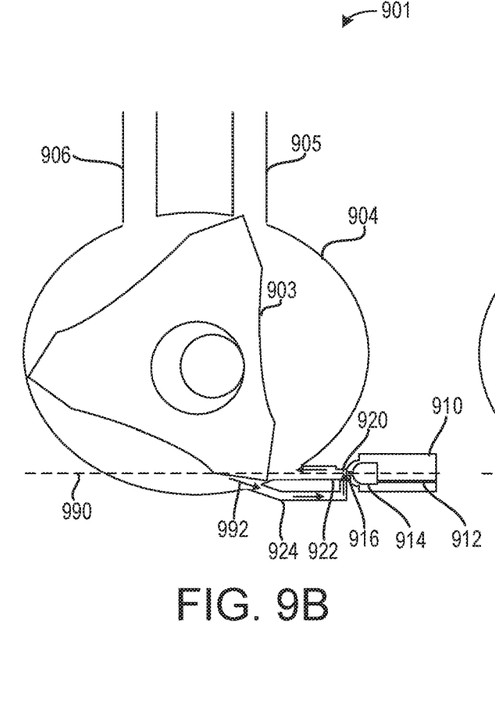
Figure 9C:
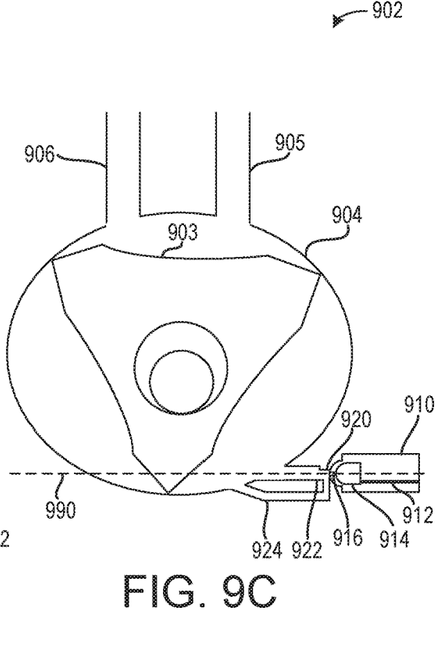
Figure 10:
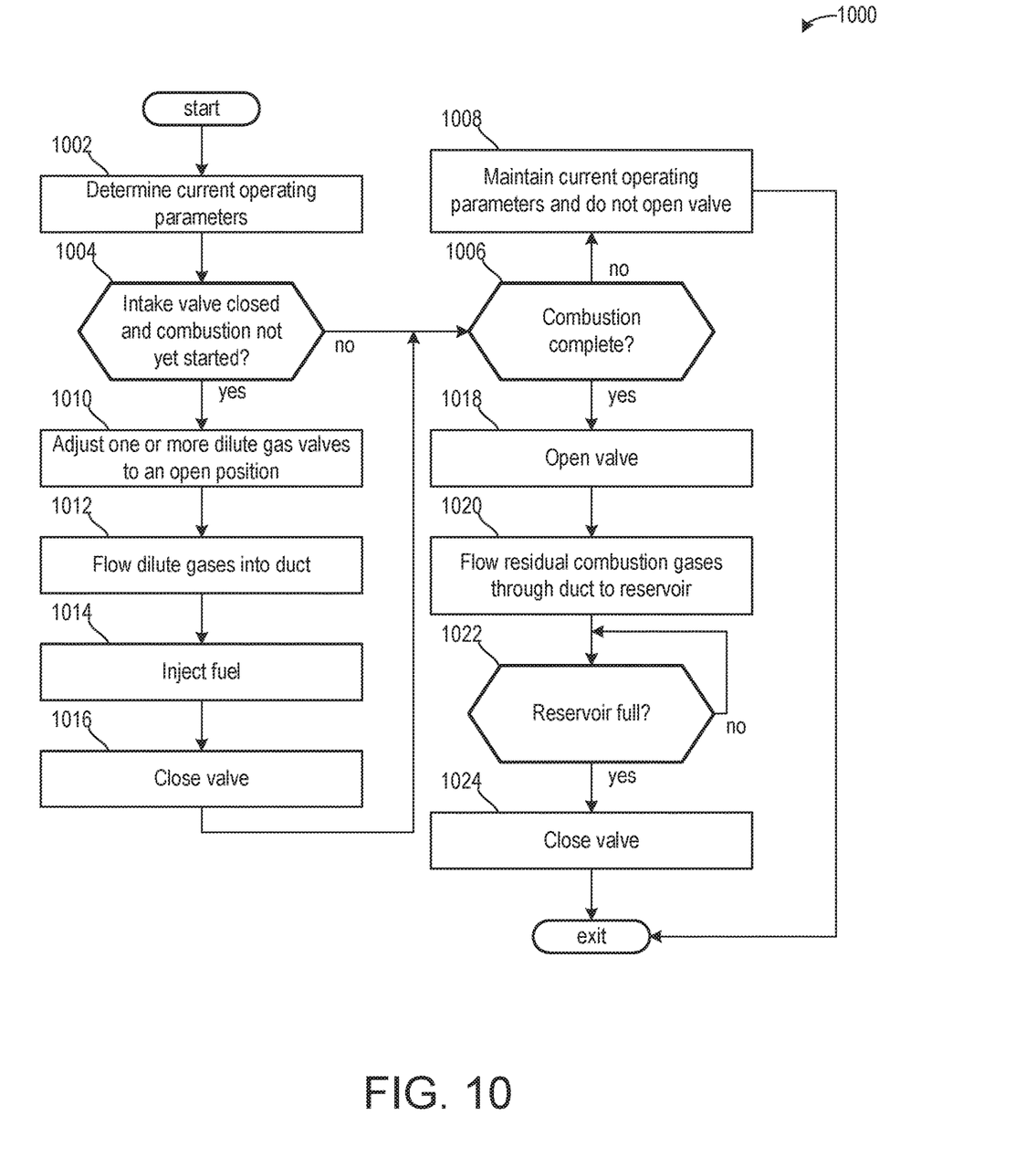
FIG. 10 shows a method for operating a valve configured to adjust dilute gas flow to a duct of the fuel injector.

The following description relates to systems and methods for a ducted fuel injector. An engine of a vehicle, which may be a hybrid vehicle, is illustrated in FIG. 1. FIGS. 2-5 illustrate examples of a single orifice nozzle injector. FIGS. 6-8 illustrate examples of a multi-orifice nozzle injector. FIGS. 9A, 9B, and 9C show different positions of a piston in a wankel engine. FIG. 10 shows a method for operating a valve configured to adjust dilute gas flow to a duct of the fuel injector.

The present disclosure relates to a controlled flow of dilute gases into ducts and/or passages of a ducted combustion system prior to an injection of fuel. Herein, dilute gases are defined as gases with a lower concentration of oxygen than the ambient combustion chamber gases prior to combustion. This may reduce the availability of oxygen within the ducts, resulting in a reduced likelihood of fuel combusting within the ducts and extends the lift-off length of the combusting fuel spray further downstream of the duct exit. The ducted fuel injector of the present disclosure may reduce soot production and provide a more robust combustion system as the ducted fuel injector mitigates undesired combustions from occurring within the duct independent of an engines boundary conditions or calibration settings.

In one example of the ducted fuel injector, a valve and a pressurized reservoir of dilute gases may be utilized to fill ducted passages of the injector during an intake stroke. In another example, additionally or alternatively, exhaust gas from a high pressure side of an exhaust manifold of a turbocharger may be used instead of the reservoir. In such an example, a control valve opens during the intake stroke or early portion of a compression stroke when the in-cylinder pressure is lower than the pressure in the manifold. In a further example, additionally or alternatively, a Wankel/rotary engine with a ducted combustion system where an air passage is configured to flow dilute gases during an expansion stroke to flow back through the ducts toward an equivalent expansion stroke where the flow of dilute gases may be controlled passively by a size of duct passages or actively with a throttling valve.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug for initiating combustion. Ignition system 190 can provide an ignition spark to cylinder 14 via spark plug in response to spark advance signal SA from controller 12, under select operating modes. However, in some embodiments, spark plug may be omitted, such as where engine 10 may initiate combustion by auto-ignition or by injection of fuel as may be the case with some diesel engines.

Fuel injector 66 may be configured to inject into a duct 18 prior to flowing fuel into the combustion chamber 30. The duct 18 is positioned within the combustion chamber 30 in face-sharing contact with a fire deck 19. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

Engine 10 is illustrated as a piston engine. However, in some examples of the present disclosure, the engine 10 may be a rotary engine (e.g., a Wankel engine), comprising a rotating crankcase and corresponding cylinders with a fixed crankshaft. Herein, the fuel injector 66 and its duct 18 are described in greater detail below in piston and rotary configurations of the engine 10.

Figure 2:
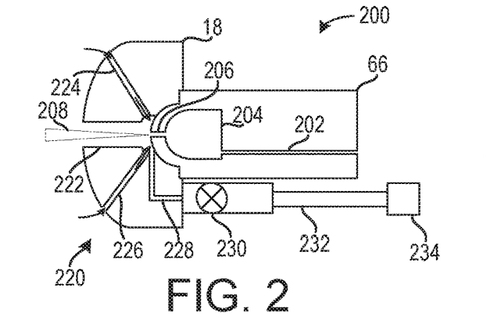
FIG. 2 illustrates a single orifice nozzle injector.

Turning now to FIG. 2, it shows a first embodiment 200 of the fuel injector 66. Components previously introduced are similarly numbered in this figure and in subsequent figures. The first embodiment 200 of the fuel injector 66 is a single orifice fuel injector, wherein the duct 18 comprises a single outlet for ejecting fuel into a combustion chamber 30.

The fuel injector 66 comprises a fuel inlet passage 202 fluidly coupling a fuel rail to a fuel sac 204 of the fuel injector 66. The fuel sac 204 comprises a fuel outlet 206 configured to flow fuel from the fuel sac 204 to the fuel duct 18. The fuel outlet 206 injects a fuel injection 208 through a central passage 222 of the duct 18. The central passage 222 is one passage of a plurality of passages 220 of the duct 18. The plurality of passages 220 further includes a plurality of ancillary passages including a first side passage 224 and a second side passage 226. The first side passage 224 and the second side passage 226 may be configured to admit combustion chamber gases from the combustion chamber to the duct 18. The combustion chamber gases may mix with the fuel injection 208 within the duct 18 before the fuel injection 208 exits the duct 18 and flows into the combustion chamber.

The plurality of passages 220 further comprises a dilute gas passage 228 fluidly coupled to a dilute gas valve 230. The dilute gas valve 230 is configured to control an amount of gas flow from a dilute gas passage 232. A reservoir 234 is fluidly coupled to the dilute gas passage 232. The reservoir 234 may store the dilute gas, which is a gas with a lower concentration of oxygen than ambient air. In one example, the dilute gas is exhaust gas recirculate (EGR), or other similar gases. The EGR may be high-pressure EGR or low-pressure EGR. Additionally or alternatively, the dilute gas may be doped with nitrogen, argon, carbon dioxide, or other similar compound.

The dilute gas valve 230 may be configured to actuate to a fully closed position, a fully open position, or a position therebetween. The fully closed position blocks dilute gas from flowing to the dilute gas passage 228. The fully open position allows a maximum amount of dilute gas to flow from the reservoir 234 to the dilute gas passage 228. An actuator may further actuate the dilute gas valve 230 to a more open position, more closely resembling the fully open position than the fully closed position, or a more closed position, more closely resembling the fully closed position than the fully open position. That is to say, the more open position is configured to flow more dilute gas from the reservoir 234 to the dilute gas passage 228 than the more closed position.

Thus, in the example of FIG. 2, the fuel injector 66 comprises central passage 222 with a width (e.g., a diameter) greater than widths of the first side passage 224 and the second side passage 226. Combustion chamber gases from the ancillary first and second side passages 224, 226 along with dilute gases from the dilute gas passage 228 may mix with the fuel injection 208 in the duct 18 to inhibit ignition of fuel within the duct. The combustion chamber gases may comprise a first pressure and the dilute gases may comprise a second pressure, greater than the first pressure. As the piston moves, the first pressure of the combustion chamber gases may change (e.g., decrease as the piston moves along a downward stroke and increase as the piston moves along an upward stroke). In one example, prior to the fuel injection 208, the dilute gas valve 230 is moved to an open position to allow oxygen depleted gases to flow into the central passage 222, the first side passage 224, and the second side passage 226 and then close once a desired dilution level is reached. In one example, the position of the dilute gas valve 230 is based on a combination of the desired dilution level, an engine speed, engine temperature, and the like. In one example, the dilute gas valve is opened during an intake stroke and maintained upon until a fuel injection occurs, after which the dilute gas valve may be closed.

Figure 3:
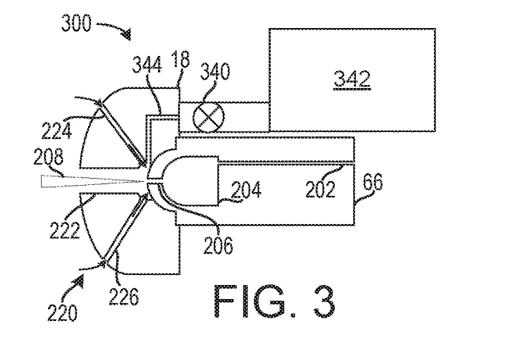
FIG. 3 illustrates a single orifice nozzle injector with a dilute gas injection filling reservoir.

Turning now to FIG. 3, it shows an embodiment 300 of the fuel injector 66. In one example, the embodiment 300 is substantially similar to the embodiment 200, except that the embodiment 300 receive a dilute gas from a high-pressure gas reservoir 342. A high-pressure gas valve 340 is configured to allow or block a flow of high-pressure dilute gases from the high-pressure gas reservoir 342 to the combustion chamber or vice-versa through a high-pressure side passage 344. In one example, the high-pressure gas reservoir 342 receives exhaust gases from the combustion chamber to which the fuel injector 66 is fluidly coupled. That is to say, combustion in a combustion chamber may supply its own combustion gases (e.g., exhaust gases which may be used as dilute gases). In such an example, when an in-cylinder pressure is less than a pressure of gases in the high-pressure gas reservoir 342, such as during an intake stroke or early combustion stroke, then the high-pressure gas valve 340 may be opened to allow high pressure dilute gases to enter the duct 18. Once the in-cylinder pressure is greater than the pressure of the gases in the high-pressure gas reservoir 342, such as following the end of combustion which may be sensed by an absence of a chemical heat release, then the high-pressure gas valve 340 may be opened to allow combustion chamber gases to flow to the high-pressure gas reservoir 342.

Figure 4:
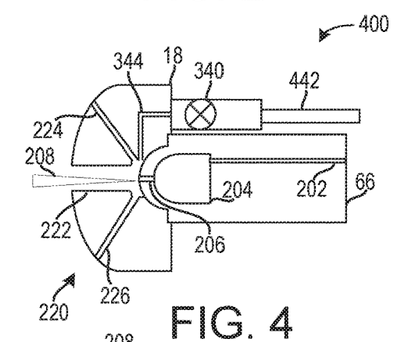
FIG. 4 illustrates a single orifice nozzle injector configured to receive gases from an adjacent cylinder.

Turning now to FIG. 4, it shows an embodiment 400 of the fuel injector 66. In one example, the embodiment 400 is substantially similar to the embodiment 300, except that the high-pressure gas reservoir is omitted. The embodiment 400 comprises a connecting high-pressure gas line 442 between adjacent cylinders. In such an example, a pair of adjacent cylinders may provide one another high-pressure dilute gases. As such, the high-pressure gas valve 340 may operate as a vent valve during some piston strokes of the combustion chamber.

Figure 5:
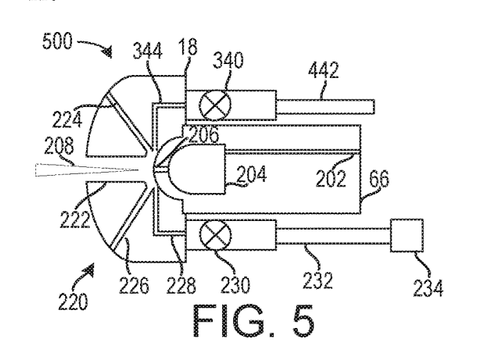
FIG. 5 illustrates a single orifice nozzle injector configured to receive dilute gases from a reservoir and gases from an adjacent cylinder.

Turning now to FIG. 5, it shows an embodiment 500 of the fuel injector 66. In one example, the embodiment 500 is substantially similar to a combination of the embodiments 200 and 400 of FIGS. 2 and 4, respectively. That is to say, the combustion chamber may receive dilute gases from an adjacent cylinder via the high-pressure gas line 442 or from the reservoir 234 via the dilute gas line 232. Operation of the dilute gas valve 230 and the high-pressure gas valve 340 may be coordinated to mitigate undesired dilute gas flows. For example, if an adjacent cylinder is deactivated, then the high-pressure gas valve 340 may be maintained in a closed position and the dilute gas valve 230 may be the only valve adjusted to flow dilute gases to the duct 18.

Turning now to FIG. 6, it shows an embodiment 600 of a non-limiting example of the fuel injector 66. The embodiment 600 illustrates a multi-orifice fuel injector which may expel a plurality of fuel injections via a plurality of outlets 622 of a plurality of passages 620. The plurality of passages 620 further comprises a central passage 624 configured to flow combustion chamber gases into the duct 18. The plurality of outlets 622 may be asymmetrically or symmetrically arranged about the central axis of the fuel injector 66. The plurality of outlets 622 are angled relative to the central axis, along which a piston may oscillate. Fuel injections 652 pass through the plurality of outlets 622. Prior to the fuel injections 652, combustion chamber gases pass through a central passage 624 and dilute gases pass through the dilute gas passage 228 or through the high-pressure side passage 344. The combustion chamber gases and dilute gases may mix with the fuel injections 652.

The embodiment 600 may be similar to the embodiment 500, except that the embodiment 600 is a multi-orifice injector configured to inject a plurality of fuel injections 622 and the embodiment 500 of FIG. 5 is a single orifice injector. As such, the embodiment 600 may receive dilute gases from each of an adjacent cylinder via the high-pressure dilute gas line 442 or via dilute gases from the reservoir 234.

Turning now to FIG. 7, it shows an embodiment 700 of a non-limiting example of the fuel injector 66. The embodiment 700 is similar to the embodiment 600, except that the embodiment 700 receives dilute gases from only an adjacent cylinder via the high-pressure dilute gas line 442. The embodiment 700 thus does not receive dilute gases from the reservoir 234.

Turning now to FIG. 8, it shows an embodiment 800 of a non-limiting example of the fuel injector 66. The embodiment 800 is similar to the embodiment 600, except that the embodiment 800 receive dilute gases from only the reservoir 234 and does not receive dilute gases from an adjacent cylinder.

Turning now to FIGS. 9A, 9B, and 9C, they show a first stage 900, a second stage 901, and a third stage 902 of a wankel type engine corresponding to different positions of a rotor 903. In one example, the wankel type engine may be used in the vehicle 5 instead of engine 10 of FIG. 1. The wankel engine comprises a fuel injector 910, which comprises a fuel inlet line 912, a fuel sac 914, and a fuel outlet 916. The fuel injector 910 further comprises a duct 920 comprises a fuel injection passage 922 and a fuel recirculation passage 924. As illustrated, the fuel injector 910 is distal to the intake duct 905 and the exhaust duct 906.

During the first stage 900, where the rotor 903 is in the top-dead center position, the fuel injection passage 922 and the fuel recirculation passage 924 are exposed to the combustion chamber 904 while combustion is occurring. The pressure in the combustion chamber 904 is equal to the pressure in duct 920. As such, flow between the duct 920 and the combustion chamber 904 does not occur. The injector 910 injects a fuel injection 911 through the first inlet line 912 along a fuel injection axis 990.

During the second stage 901, where an expansion stroke is occurring, combustion is complete and the fuel recirculation passage 924 is exposed to the expansion side of the wankel rotor 903 and the injection passage 922 is exposed to the compression side. In such an example, the pressure of the expansion side is greater than a pressure of the compression side, resulting in combustion gases flowing from the expansion side, through the fuel recirculation passage 924, through the injection passage 922, and into the compression side, as illustrated via arrow 992.

During the third stage 902, the rotor 903 has rotated and the expansion side stroke is sealed from the compression side and pressures in the duct 920 are equalized (e.g., balanced) such that gas glow through the duct 920 is stopped. As such, dilute gases that entered the duct 920 from the expansion side during the second stage 901 remain therein for a subsequent combustion event.

FIGS. 1-9C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 10, it shows a method 1000 for operating a valve of a fuel injector, such as a fuel injector on one of FIGS. 2-8, for adjusting a dilute gas flow to a fuel injector duct. Instructions for carrying out method 1000 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 1000 begins at 1002, which includes determining current operating parameters. Current operating parameters may include but are not limited to one or more of a throttle position, a manifold pressure, an engine speed, an engine temperature, a vehicle fans, an EGR flow rate, and an air/fuel ratio.

The method 1000 begins at 1004, which includes determining if an intake valve is closed and if a combustion process has not yet started. The combustion process may begin once a spark has occurred in a spark-ignited engine or a piston has moved into a certain portion of a compression stroke. If the answer is no, and either the intake valve is open or combustion has begun, then the method proceeds to 1006 to determine if combustion is complete. If combustion is not complete, then the method 1000 proceeds to 1008, which includes maintaining current operating parameters and does not open a valve. In the example of the method 1000, the valve is a dilution gas valve or the like. In one example, the valve is identical to the dilution valve 230 of FIG. 2. Additionally or alternatively, the valve is identical to the high-pressure gas dilution valve 340 of FIG. 3. In one example, the method 1000 may adjust positions of each of the dilution valve 230 and the high-pressure gas dilution valve 340. As such, a controller may be configured to operate the embodiment 500 of the fuel injector 66 of FIG. 5.

Returning to 1004, if the intake valve is closed and combustion has not yet started and/or been initiated, then the method 1000 proceeds to 1010 to adjust one or more dilute gas valves to an open position. In one example, a magnitude of an opening of the open position is based on one or more of a desired dilution amount, an engine speed, an engine temperature, a fuel injection amount, an EGR flow rate, and a dilute gas pressure. In one example, the valve is moved to a more open position as the desired dilution amount increases. Additionally or alternatively, the valve is moved to a more open position as the engine speed increases. Additionally or alternatively, the valve is moved to a more open position as the engine temperature increases. Additionally or alternatively, in some examples, the valve is moved to a more open position as the fuel injection amount increases. In some examples, additionally or alternatively, the valve is moved to a more open position as the EGR flow rate decreases. Additionally or alternatively, the valve is moved to the more open position as the dilute gas pressure decreases. In one example, the dilute gas pressure may change based on when dilute gases are drawn from within a cylinder. Additionally or alternatively, in-cylinder pressures may be affected by leaks, valve timing, injection timing, and/or spark timing.

The method 1000 proceeds to 1012, which includes flowing dilute gases into the duct of the fuel injector. The dilute gases may fill the passages of the duct.

The method 1000 proceeds to 1014, which includes injecting fuel into the fuel duct. The fuel injection may mix with the dilute gases, which may block pre-ignition.

The method 1000 proceeds to 1016, which includes closing the valve. The valve is closed due to a combustion process beginning.

Following 1016, or following a no at 1004, then method 1000 proceeds to 1006, which includes determining if a combustion process is complete. If the combustion process is complete, then the method 1000 proceeds to 1018 to open the valve.

The method 1000 proceeds to 1020, which includes flowing residual combustion gases through the duct to a reservoir. Additionally or alternatively, the residual combustion gases may flow to an adjacent cylinder or different stage of the combustion process in an example of a rotary piston.

The method 1000 proceeds to 1022, which includes determining if a reservoir is full. Alternatively, the method 1000 may determine if a desired dilution of an adjacent cylinder or separate stage of a cylinder is met. At any rate, if the reservoir is not full or if the desired dilution is not met, then the method 1000 continues to maintain the valve open and flows residual gases to the reservoir and/or to the adjacent cylinder.

If reservoir is full or if the desired dilution is met, then the method 1000 proceeds to 1024, which includes closing the valve. As such, gas flow between the reservoir and a cylinder and/or between adjacent cylinders is stopped.

In this way, a ducted injector may receive oxygen depleted gases from a reservoir. The duct comprises a plurality of passages configured to mix one or more fuel injections with the oxygen depleted gas. The technical effect of mixing the oxygen depleted with the fuel injection is to reduce a likelihood of the fuel injection igniting earlier than desired. By doing this, a fuel injection may penetrate further into the combustion chamber and soot production may be reduced.

An example of a system, comprising a rotary engine comprising a ducted fuel injector.

A first example of the system, further comprises where the ducted fuel injector comprises a fuel injection passage and a dilute gas passage.

A second example of the system, optionally including the first example, further includes where the fuel injection passage and the dilute gas passage are fluidly coupled to one another.

A third example of the system, optionally including one or more of the previous examples, further includes where the dilute gas passage receives combustion gases from an expansion stage of a cylinder or the rotary engine.

A fourth example of the system, optionally including one or more of the previous examples, further includes where the dilute gas passage receives a dilute gas, wherein the dilute gas comprises a lower-concentration of oxygen than ambient air.

A fifth example of the system, optionally including one or more of the previous examples, further includes where the dilute gas is exhaust-gas recirculate or air doped with nitrogen gas.

A sixth example of the system, optionally including one or more of the previous examples, further includes where a reservoir is fluidly coupled to the dilute gas passage, wherein the reservoir comprises a dilute gas with a low concentration of oxygen relative to ambient air.

A seventh example of the system, optionally including one or more of the previous examples, further includes where a valve configured to adjust a flow of dilute gas from the reservoir to the dilute gas passage.

An eighth example of the system, optionally including one or more of the previous examples, further includes where the rotary engine comprises a plurality of cylinders, wherein adjacent cylinders of the plurality of cylinders are fluidly coupled to dilute gas passages of fuel injectors of the adjacent cylinders.

An example of an engine system, comprising a combustion chamber comprising a ducted fuel injector, wherein the ducted fuel injector comprises a dilute gas passage configured to flow dilute gases into a duct from a dilute gas source, further comprising a valve configured to adjust a dilute gas flow between the combustion chamber and the dilute gas source, a controller comprising computer-readable instructions stored on non-transitory memory thereof that when executed enable the controller to adjust a position of the valve to flow dilute gases from the dilute gas source to the dilute gas passage in response to an intake valve being closed and a combustion process not yet started, and adjust the position of the valve to flow dilute gases from the combustion chamber to the dilute gas source in response to the combustion process being complete.

A first example of the engine system further includes where the dilute gas source is a reservoir.

A second example of the engine system, optionally including the first example, further includes where the dilute gas source is an adjacent combustion chamber.

A third example of the engine system, optionally including one or more of the previous examples, further includes where the position of the valve is an open position, wherein a magnitude of the opening is based on one or more of an EGR flow rate, a desired dilution amount, an engine speed, an engine temperature, and fuel injection amount.

A fourth example of the engine system, optionally including one or more of the previous examples, further includes where the instructions further enable the controller to adjust the position of the valve to a closed position in response to one or more of the intake valve being open, the combustion process occurring, a desired dilution amount being met, and a dilute gas source load being above a threshold load.

A fifth example of the engine system, optionally including one or more of the previous examples, further includes where the desired dilution amount is based on a likelihood of premature ignition, wherein the desired dilution amount increases as the likelihood of premature ignition increases.

A sixth example of the engine system, optionally including one or more of the previous examples, further includes where the combustion chamber is arranged in a Wankel engine.

An example of a rotary engine, comprises a fuel injector of a combustion chamber comprising a duct, wherein the duct comprises a dilute gas passage fluidly coupled to a fuel injection passage, wherein the dilute gas passage and the fuel injection passage are fluidly coupled to separate portions of the combustion chamber during some positions of a rotor of the combustion chamber.

A first example of the rotary engine, further includes where separate portions include a first portion and a second portion, wherein gases from the first portion flow into the dilute gas passage.

A second example of the rotary engine, optionally including the first example, further includes where the gases mix with a fuel injection.

A third example of the rotary engine, optionally including one or more of the previous examples, further includes where the fuel injector is positioned distally to an exhaust valve and an intake valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a rotary engine comprising a ducted fuel injector, the ducted fuel injector comprising a fuel injection passage and a dilute gas passage fluidly coupled to one another downstream and outside of the ducted fuel injector relative to a direction of injection.

2. The system of claim 1, wherein the dilute gas passage receives combustion gases from an expansion stage of a cylinder of the rotary engine.

3. The system of claim 1, wherein the dilute gas passage receives a dilute gas, wherein the dilute gas comprises a lower-concentration of oxygen than ambient air.

4. The system of claim 3, wherein the dilute gas is exhaust-gas recirculate or air doped with nitrogen gas.

5. The system of claim 1, wherein a reservoir is fluidly coupled to the dilute gas passage, wherein the reservoir comprises a dilute gas with a low concentration of oxygen relative to ambient air.

6. The system of claim 5, further comprising a valve configured to adjust a flow of dilute gas from the reservoir to the dilute gas passage.

7. The system of claim 1, wherein the rotary engine comprises a plurality of cylinders, wherein adjacent cylinders of the plurality of cylinders are fluidly coupled to dilute gas passages of fuel injectors of the adjacent cylinders.

8. An engine system, comprising:
   a combustion chamber of a Wankel engine comprising a ducted fuel injector, wherein the ducted fuel injector comprises a dilute gas passage configured to flow dilute gases into a duct from a dilute gas source directly to a location of the duct downstream of an injection of the ducted fuel injector, wherein the duct is arranged outside of a fuel injector portion of the ducted fuel injector, further comprising a valve configured to adjust a dilute gas flow between the combustion chamber and the dilute gas source, and wherein the ducted fuel injector is positioned to directly inject into the duct; and
   a controller comprising computer-readable instructions stored on non-transitory memory thereof that when executed enable the controller to:
   adjust a position of the valve to flow dilute gases from the dilute gas source to the dilute gas passage in response to an intake valve being closed and a combustion process not yet started; and adjust the position of the valve to flow dilute gases from the combustion chamber to the dilute gas source in response to the combustion process being complete.

9. The engine system of claim 8, wherein the dilute gas source is a reservoir.

10. The engine system of claim 8, wherein the dilute gas source is an adjacent combustion chamber.

11. The engine system of claim 8, wherein the position of the valve is an open position, wherein a magnitude of the opening is based on one or more of an EGR flow rate, a desired dilution amount, an engine speed, an engine temperature, and fuel injection amount.

12. The engine system of claim 8, wherein the instructions further enable the controller to adjust the position of the valve to a closed position in response to one or more of the intake valve being open, the combustion process occurring, a desired dilution amount being met, and a dilute gas source load being above a threshold load.

13. The engine system of claim 12, wherein the desired dilution amount is based on a likelihood of premature ignition, wherein the desired dilution amount increases as the likelihood of premature ignition increases.

14. A rotary engine, comprising:
a fuel injector of a combustion chamber comprising a duct, wherein the duct comprises a dilute gas passage fluidly coupled to a fuel injection passage at a portion of the duct downstream and outside of the fuel injector relative to a direction of a fuel injection, wherein the dilute gas passage and the fuel injection passage are fluidly coupled to separate portions of the combustion chamber during some positions of a rotor of the combustion chamber.

15. The rotary engine of claim 14, wherein separate portions include a first portion and a second portion, wherein gases from the first portion flow into the dilute gas passage.

16. The rotary engine of claim 15, wherein the gases mix with the fuel injection.

17. The rotary engine of claim 14, wherein the fuel injector is positioned distally to an exhaust duct and an intake duct.

18. The system of claim 1, wherein the dilute gas passage and the fuel injection passage are coupled to a same combustion volume in at least one piston position.

19. The system of claim 1, wherein the dilute gas passage receives a mixture of gases from a volume of the rotary engine into which the ducted fuel injector is directly injected.

20. The system of claim 1, wherein the ducted fuel injector comprises at least two side passages configured to admit combustion chamber gases from a combustion chamber to the duct of the ducted fuel injector.

* * * * *